US012000545B1

(12) United States Patent
Cao

(10) Patent No.: US 12,000,545 B1
(45) Date of Patent: Jun. 4, 2024

(54) LED DEVICE WITH MAGNETIC ATTRACTING ASSEMBLY AND LIGHTING DEVICE HAVING THE SAME

(71) Applicant: Zhenkun Cao, Shenzhen (CN)

(72) Inventor: Zhenkun Cao, Shenzhen (CN)

( * ) Notice: Subject to any disclaimer, the term of this patent is extended or adjusted under 35 U.S.C. 154(b) by 0 days.

(21) Appl. No.: 18/500,271

(22) Filed: Nov. 2, 2023

(30) Foreign Application Priority Data

Sep. 28, 2023 (CN) ......................... 202322649796.0

(51) Int. Cl.
*F21S 9/02* (2006.01)
*F21K 9/237* (2016.01)
*F21V 19/00* (2006.01)

(52) U.S. Cl.
CPC ................ *F21K 9/237* (2016.08); *F21S 9/02* (2013.01); *F21V 19/001* (2013.01)

(58) Field of Classification Search
CPC ...... F21S 9/02–024; F21K 9/23; F21K 9/235; F21K 9/237
See application file for complete search history.

(56) References Cited

U.S. PATENT DOCUMENTS 8,556,465 B2 * 10/2013 Lee ........................ F21V 23/009 362/249.02
10,887,958 B1 * 1/2021 Fu ........................ H05B 47/105
2006/0227558 A1 * 10/2006 Osawa .................. F21V 29/773 362/351
2007/0247840 A1 * 10/2007 Ham ......................... F21K 9/23 362/227
2010/0167576 A1 * 7/2010 Zhou ..................... H01J 61/327 439/375
2010/0290207 A1 * 11/2010 Chan ....................... F21L 4/027 362/183
2011/0068692 A1 * 3/2011 Tian ....................... H05B 47/17 315/313
2013/0070456 A1 * 3/2013 Jang ........................ F21K 9/232 362/235
2013/0128564 A1 * 5/2013 Lin ......................... F21V 15/01 362/184
2014/0049972 A1 * 2/2014 McGuire ................... F21K 9/23 362/427
2018/0112840 A1 * 4/2018 Rzasa ..................... F21K 9/237
(Continued)

*Primary Examiner* — Abdulmajeed Aziz
*Assistant Examiner* — Steven Y Horikoshi
(74) *Attorney, Agent, or Firm* — Daniel M. Cohn; Howard M. Cohn

(57) ABSTRACT

An LED device and a lighting device are disclosed. The lighting device includes a mounting device and the LED device. The LED device includes a connecting piece, a light source base, a light source assembly, and a magnetic attracting assembly. The light source base includes a fixing portion and a mounting portion. the fixing portion is connected to the mounting portion. The fixing portion is connected to the connecting piece. The magnetic attracting assembly is arranged between the light source assembly and the mounting portion. The magnetic attracting assembly is configured to magnetically connect the light source assembly to the mounting portion, so that the light source assembly is movably installed on the light source base. The lighting device is able to be installed in different usage scenarios without changing the external circuit wiring and has positive significance for maintaining the original layout of the old house.

17 Claims, 7 Drawing Sheets

(56) References Cited

U.S. PATENT DOCUMENTS

| | | | | |
|---|---|---|---|---|
| 2020/0370711 | A1* | 11/2020 | Fu | F21V 29/70 |
| 2021/0404618 | A1* | 12/2021 | Li | H05B 45/20 |
| 2022/0260216 | A1* | 8/2022 | Li | F21V 23/04 |

* cited by examiner

LED DEVICE WITH MAGNETIC ATTRACTING ASSEMBLY AND LIGHTING DEVICE HAVING THE SAME

TECHNICAL FIELD

The present disclosure relates to a technical field of LED devices, and in particular to an LED device and a lighting device.

BACKGROUND

At present, an LED product generally comprises a housing, a light panel, a lampshade, and a lamp holder. The lamp holder is connected to an external lamp holder interface so that the lamp panel emits light. The lamp head interface needs to be connected to a power supply through circuit wiring. However, some old house have aging circuits, causing original lamp sockets of lighting devices such as wall lamps, table lamps, etc. not be powered on and the lighting devices to be unable to provide lighting. In order to realize house lighting, it is necessary to dig into walls to repair the circuit wiring or re-plan the circuit wiring. However, some special ancient buildings need to preserve and maintain their integrity and maintain their original appearance. The wall structures thereof cannot be damaged, so repair or re-planning of the circuit wiring is unable to be carried out.

Therefore, it is necessary to provide an LED device to solve above technical problems.

SUMMARY

Embodiments of the present disclosure provide an LED device and a lighting device, which are able to be installed in a variety of usage scenarios without external circuit wiring and have positive significance for maintaining an original layout of an old house and retaining an original appearance of the old house.

In a first aspect, the embodiments of the present disclosure provide the LED device. The LED device comprises a connecting piece, a light source base, a magnetic attracting assembly, and a light source assembly.

The light source base comprises a fixing portion and a mounting portion. The fixing portion is connected to the mounting portion. The fixing portion is connected to the connecting piece. The magnetic attracting assembly is arranged between the light source assembly and the mounting portion. The magnetic attracting assembly is configured to magnetically connect the light source assembly to the mounting portion, so that the light source assembly is movably installed on the light source base.

In the embodiments of the present disclosure, the magnetic attracting assembly of the LED device is movably installed on the light source assembly of the light source base, thereby facilitating replacement of different light source assemblies on the light source base. Since the mounting device is fixed to a mounting surface of a mounting object, installation is easy during actual use and is suitable for various usage scenarios.

In one optional embodiment, the magnetic attracting assembly comprises a magnetic attracting piece and a magnetic attracting matching piece. The magnetic attracting piece is installed on one of the light source assembly and the mounting portion. The magnetic attracting matching piece is installed on the other one of the light source assembly and the mounting portion.

In the embodiment, the magnetic attracting piece is connected to the magnetic attracting matching piece, so as to realize connection between the light source assembly and the mounting portion.

In one optional embodiment, the magnetic attracting piece is a magnet body. The magnetic attracting matching piece is a matching magnet or a metal piece capable of magnetically connected to the magnet body.

In the embodiment, the metal piece is made of iron, nickel, cobalt, or other metals.

In one optional embodiment, the fixing portion is detachably connected to the connecting piece.

In one optional embodiment, the light source assembly comprises an outer shell, a power supply, a printed circuit board (PCB), and LED lamp beads. The outer shell is movably connected to the light source base. The power supply is arranged in the outer shell. The PCB is electrically connected to the power supply. The LED lamp beads are arranged on the PCB.

In the embodiment, the light source assembly has a simple structure, is easy to mount, and has low cost.

In one optional embodiment, the magnetic attracting piece is arranged on the outer shell. The magnetic attracting matching piece is arranged on the mounting portion.

In the embodiment, the magnetic attracting piece is arranged on the outer shell, enabling the light source assembly to be magnetically installed on different metal components, thereby improving a diversity of use of the light source assembly.

In one optional embodiment, the light source assembly further comprises a diffusing piece. The diffusing piece is fixedly connected to the outer shell and located in a light emitting direction of the LED lamp beads.

In the embodiment, uniformity of light emitted by the light source assembly is improved, avoiding glare caused by the light.

In one optional embodiment, a protruding connecting portion is arranged at a position of the diffusing piece where the diffusing piece is connected to the outer shell. A groove matched with the protruding connecting portion is defined in the outer shell. The protruding connecting portion is fastened and fixed in the groove, so that the diffusing piece is fixedly connected to the outer shell.

In the embodiment, the diffusing piece is connected in the groove through the protruding connecting portion, so that the diffusing piece is detachably connected to the outer shell, which facilitates mounting and detachment of the diffusing piece.

In one optional embodiment, the outer shell comprises an accommodating groove, a first supporting portion arranged in the accommodating groove, and two second supporting portions arranged in the accommodating groove. The first supporting portion is perpendicular to the two second supporting portions. The two second supporting portions are arranged on two opposite sides of the first supporting portion. A top portion of the first supporting portion defines an arc-shaped section matched with a shape of the power supply. A fixing groove configured to fix the power supply is defined between the two second supporting portions.

In the embodiment, the power supply is easily installed in the outer shell.

In one optional embodiment, the outer shell comprises at least two fixing columns arranged in the accommodating groove. The PCB is fixed on the at least two fixing columns.

In the embodiment, the PCB is easily installed in the outer shell.

In one optional embodiment, a charging interface is arranged on the outer shell. The charging interface is electrically connected to the power supply. The charging interface is configured to charge the power supply.

In one optional embodiment, the light source assembly further comprises a control component, the control component is installed in the outer shell and is communicated with the PCB. The control component is configured to control the LED lamp beads to emit light.

In the embodiment, the LED lamp beads are remotely controlled to emit the light through the control component.

In one optional embodiment, a button is arranged on the outer shell. The button is communicated with the control component. The button is configured to control the LED lamp beads to emit light.

In the embodiment, working states of the LED lamp beads are switched by pressing the button to improve user experience.

In one optional embodiment, a positioning portion is arranged on one of the outer shell and the mounting portion. A positioning groove is defined on the other one of the outer shell and the mounting portion.

In the embodiment, mounting and fixing of the light source assembly and the light source base is realized, which avoids rotation of the light source assembly.

In one optional embodiment, the connecting piece is a housing defining a fixing cavity. The fixing cavity is arranged on a middle portion of the connecting piece. Outer threads are defined on an outer surface of the housing. The fixing portion is fixed in the fixing cavity.

In the embodiment, detachable connection between the connecting piece and the light source base is realized.

In one optional embodiment, the mounting portion comprises a horizontal loading surface, and an arc-shaped guide surface is located on an outer edge of the horizontal loading surface and extends upward. The arc-shaped guide surface is matched with a shape of a bottom portion of the outer shell. The bottom portion of the outer shell is fixedly attached to the horizontal loading surface and the arc-shaped guide surface.

In the embodiment, the LED device forms a complete whole in appearance and has a beautiful appearance.

Based on the above embodiments, the LED device of the present disclosure is able to be installed in the variety of usage scenarios without the external circuit wiring and has positive significance for maintaining the original layout of the old house and retaining the original appearance of the old house. Further, the LED device of the present disclosure is able to be fixed to different lighting devices, which has strong usability, is simple to mount and detach, and is compatible with requirements of different use environments.

In a second aspect, the present disclosure provides the lighting device. The lighting device comprises a mounting device, a connecting fitting piece, and the LED device mentioned above.

The connecting fitting piece is configured to connect to the connecting piece. The mounting device is fixedly connected to the connecting fitting piece.

In one optional embodiment, the mounting device comprises a bracket body. The bracket body is connected to the connecting fitting piece.

In the embodiment, detachable connection between the LED device and the mounting device is realized.

In one optional embodiment, the mounting device comprises a lampshade. The lampshade is connected to the bracket body. The lampshade is located outside the LED device.

In the embodiment, the LED device is effectively protected, and an appearance of the lighting device is beautiful.

In one optional embodiment, the mounting device comprises a mounting piece. The mounting piece is connected to the bracket body and is configured to fixedly connected to a mounting surface of a mounting object.

In the embodiment, the mounting piece is able to be fixedly connected to the mounting surface of the mounting object, so that the lighting device is able to be installed to different positions in the old house.

In the present disclosure, the mounting device enables the LED device being installed to a surface of a wall, a surface of a desk, or a surface of other mounting objects. The LED device is able to be connected to different mounting devices such as a wall lamp, a table lamp, etc., through the connecting piece. The light source base and the light source assembly are magnetically connected and fixed, which is easy to install and detach, and is suitable for a variety of mounting usage scenarios and improves the user experience.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

Figure 1:
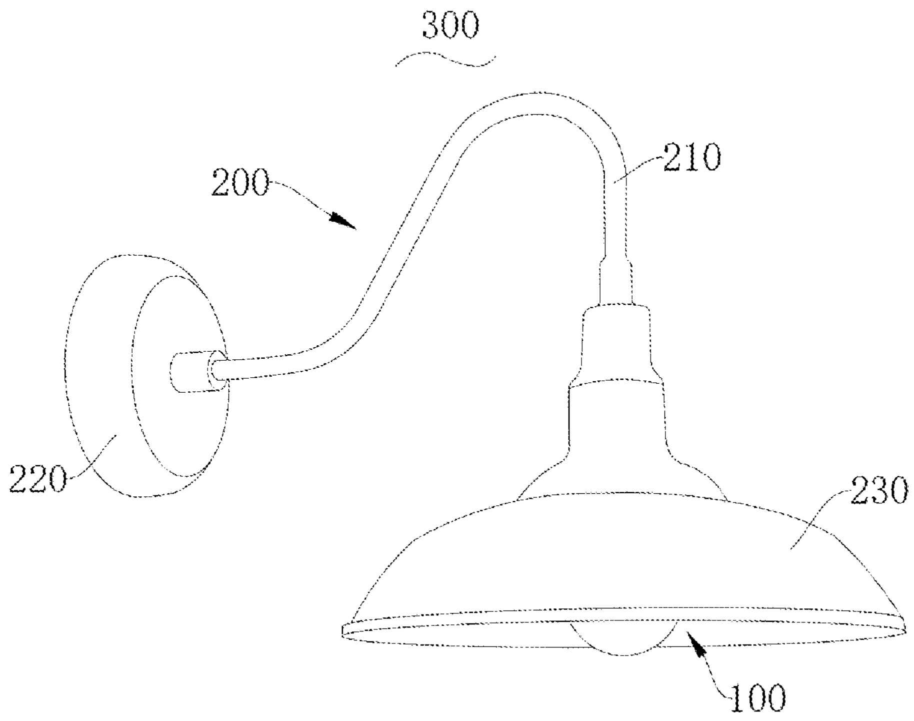
FIG. 1 is a schematic diagram of a lighting device according to one embodiment of the present disclosure.

In the drawings: 100—LED device; 110—Connecting piece; 120—light source base; 121—fixing portion; 122—mounting portion; 1221—horizontal loading surface; 1222—arc—shaped guide surface; 130—light source assembly; 131—outer shell; 1311—accommodating groove; 1312—first supporting portion; 1313—second supporting portion; 1314—groove; 1315—fixing column 1316—charging interface; 1317—button; 132—power source; 133—PCB; 134—LED lamp bead; 135—diffusing piece; 1351—protruding connecting portion; 136—control component; 140—magnetic attracting assembly; 141—magnetic attracting piece 142—magnetic attracting matching piece; 151—positioning portion; 152—positioning groove; 200—mounting device; 210—bracket body; 220—mounting piece; 230—lampshade; 300—lighting device.

The realization of the purpose, functional features, and characteristics of the present disclosure will be further described with reference to the embodiments and the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar elements unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as "first" and "second" are only used for the purpose of description, rather than being understood to indicate or imply relative importance or hint the number of indicated technical features. Thus, the feature limited by "first" and "second" can explicitly or impliedly include at least one feature. Unless otherwise indicated, the term "a plurality of" means two or more. The term "and/or" depict relationship between associated objects and there are three relationships thereon. For example, A and/or B may indicate A exists alone, A and B exist at the same time, and B exists alone. The character "/" generally indicates that the associated object is alternative. The terms "first", "second", "third", etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term "and/or" includes any and all combinations of one or more of the associated listed items.

As shown in FIG. 1, embodiments of the present disclosure provide an LED device 100 and a lighting device 300. The lighting device 300 comprises a mounting device 200; a connecting fitting piece (not shown in the drawings), and the LED device 100. The mounting device 200 comprises a bracket body 210. The bracket body 210 is connected to the connecting fitting piece. The LED device 100 comprises a connecting piece 110, a light source base 120, a light source assembly 130, and a magnetic attracting assembly 140.

Figure 2:
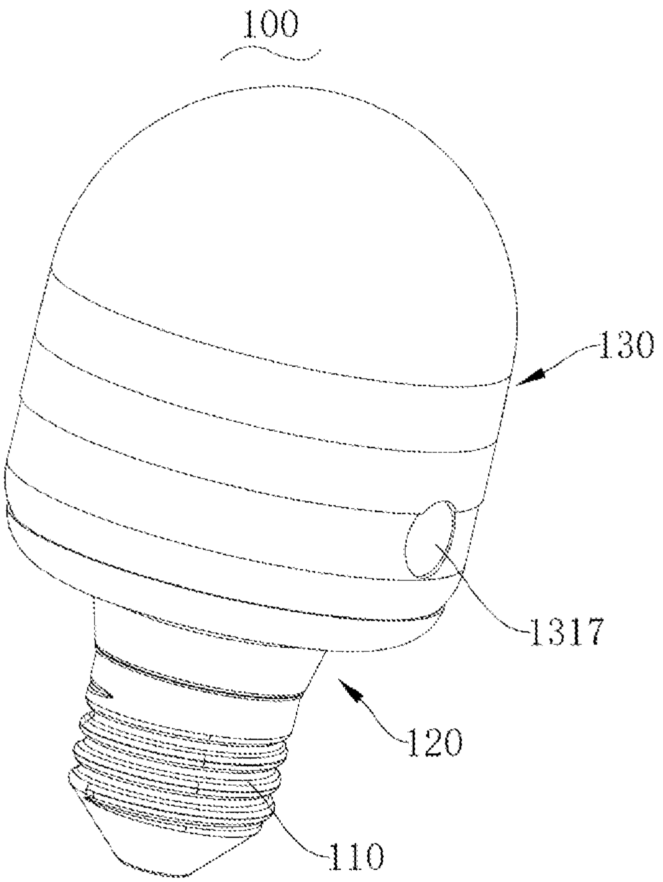
FIG. 2 is a schematic diagram of an LED device according to one embodiment of the present disclosure.
Figure 3:
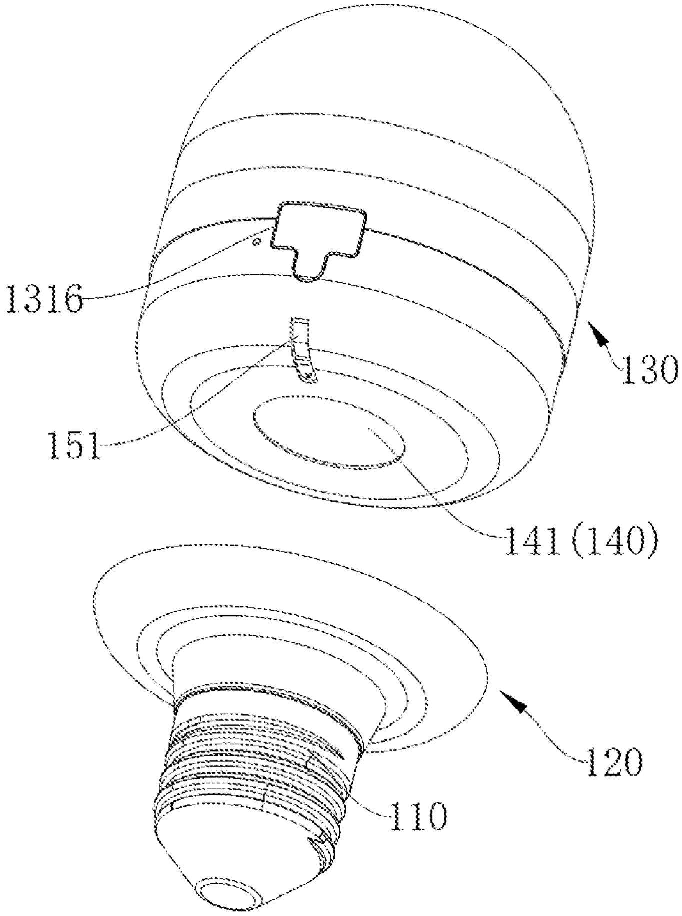
FIG. 3 is an exploded schematic diagram of the LED device according to one embodiment of the present disclosure.
Figure 4:
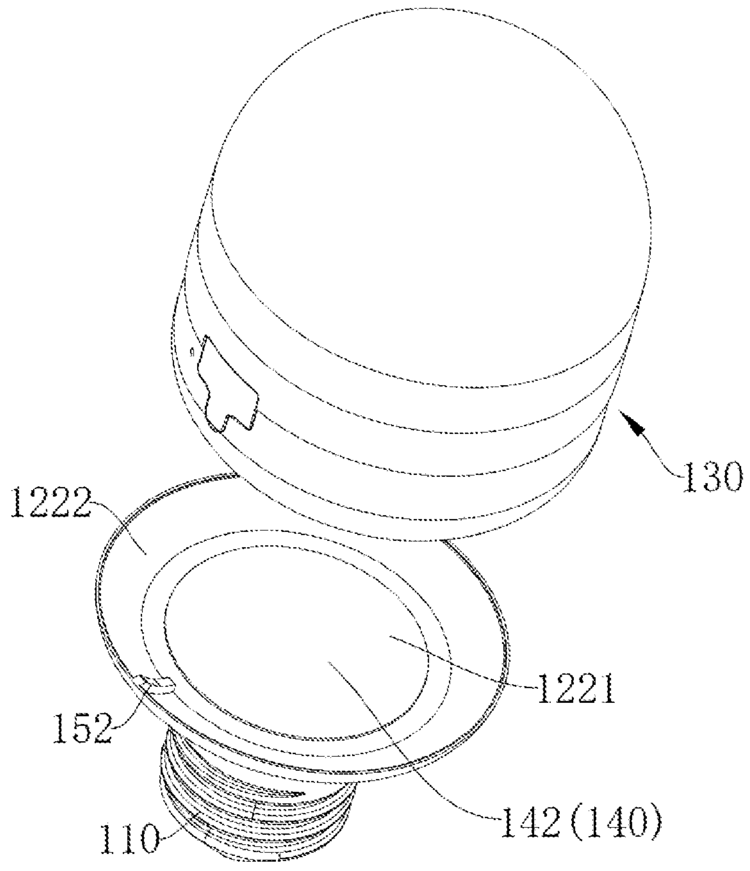
FIG. 4 is another exploded schematic diagram of the LED device according to one embodiment of the present disclosure.

As shown in FIGS. 2-4, the connecting piece 110 is configured to fixedly connected to the connecting fitting piece. In some embodiments, the connecting piece 110 is a light source connecting piece, such as an E27 lamp holder, an E14 lamp holder, a B22 lamp holder, a GU10 lamp holder, etc. The connecting piece 110 is a housing defining a fixing cavity. The fixing cavity is arranged on a middle portion of the connecting piece 110. Outer threads are defined on an outer surface of the housing. Some wall lamps in old houses use light source connecting pieces as a connection method. The connecting piece 110 of the embodiment of the present disclosure is the light source connecting piece, so that the LED device 100 is able to be installed on any one of the wall lamps, thus retaining the original appearance of the old houses. In addition, in the embodiment of the present disclosure, the connecting piece 110 is detachably connected to the light source base 120, so that the connecting piece is selected from connecting pieces having different specifications according to a connection manner of a specific lighting device, thereby meeting mounting requirements of lighting devices having different specifications.

It is understood that in some embodiments, the connecting piece 110 and the light source base 120 are integrally formed. In some embodiments, the connecting piece 110 is a clamping piece or a mounting bracket. When the LED device needs to be installed on some new-type wall lamps, new-type table lamps, and other new-type lighting devices, it only needs to fixedly connect the light source base 120 to the mounting device 200, which is not limited thereto. It is understood that the connecting fitting piece is a fitting piece matched with the light source connecting piece, or the connecting fitting piece is a snapping piece or a matching bracket that matches the clamping piece or the mounting bracket.

Figure 5:
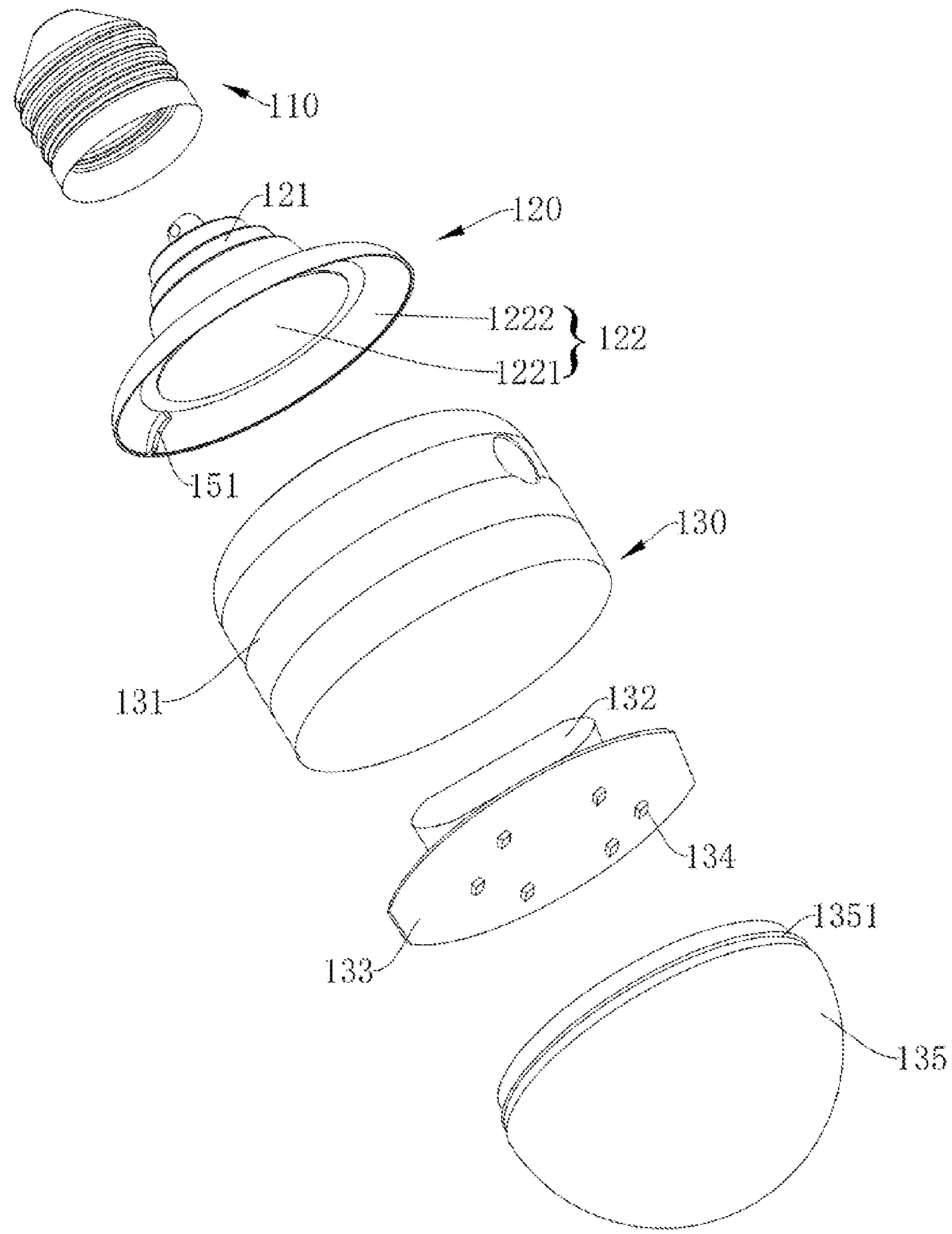
FIG. 5 is another exploded schematic diagram of the LED device according to one embodiment of the present disclosure.

As shown in FIG. 5, the light source base 120 comprises a fixing portion 121 and a mounting portion 122. The fixing portion 121 is connected to the mounting portion 122. The fixing portion 121 is detachably connected to the connecting piece 110.

The fixing portion 121 is fixed in the fixing cavity so that the connecting piece 110 is fixedly connected to the light source base 120. The fixing portion 121 maybe fixed in the fixing cavity by thread fixation, screw fixation or buckle fixation. In some embodiments, the fixing portion 121 is a plurality of steps with different sizes, thereby adapting to various specifications of the connecting pieces.

As shown in FIGS. 3 and 4, the magnetic attracting assembly 140 is arranged between the light source assembly 130 and the mounting portion 122. The magnetic attracting assembly 140 is configured to magnetically connect the light source assembly 130 to the mounting portion 122, so that the light source assembly 130 is movably installed on the light source base 120.

In some embodiments, the magnetic attracting assembly 140 comprises a magnetic attracting piece 141 and a magnetic attracting matching piece 142. The magnetic attracting piece 141 is installed on one of the light source assembly 130 and the mounting portion 122. The magnetic attracting matching piece 142 is installed on the other one of the light source assembly 130 and the mounting portion 122. In some embodiments, the magnetic attracting piece 141 is a magnet body. The magnetic attracting matching piece 142 is a matching magnet or a metal piece capable of magnetically connected to the magnet body. In some embodiments, the metal piece is made of iron, nickel, cobalt, or other metals.

In the embodiments of the present disclosure, the connecting piece 110 is detachably connected to the connecting fitting piece, so that the light source base 120 and the light source assembly 130 are installed on the mounting device 200.

The LED device 100 of the embodiments of the present disclosure is capable of being installed on the lighting device 300 such as an old-fashioned wall lamp or an old-fashioned table lamp. The light source assembly 130 of the present disclosure emits light independently without being connected to external circuit wiring. Therefore, the old-fashioned house is preserved with its original structure while lighting is realized without destroying walls and repairing aging circuit wiring.

Moreover, the connecting piece 110 of the present disclosure is capable of meeting installation requirements of different lighting devices of different specifications. The light source assembly 130 is magnetically fixed to the light source base 120, which is simple to install and detach, making it easy to replace the light source assembly 130 that is broken or run out.

In some embodiments, the mounting device 200 comprises a lampshade 230. The lampshade 230 is connected to the bracket body 210. The lampshade 230 is located outside the LED device 100. The mounting device 200 comprises a mounting piece 220. The mounting piece 220 is connected to the bracket body 220 and is configured to fixedly connected to a mounting surface of a mounting object.

In some embodiments, the mounting piece 220 is a sheet metal piece. The sheet metal piece is a plate-like structure with a fixed surface. The fixed surface of the mounting piece 220 is matched with the mounting surface of the mounting object such as a wall or a desktop. The sheet metal piece has a beautiful appearance and good wear resistance, excellent quality, and other characteristics. In some embodiments, the mounting piece 220 is a plastic piece and is injection molded, which has a simple processing technology and a low cost. The lampshade 230 is configured to collect light, so as to improve a brightness of the light source assembly 130 and protect the light source assembly 130 to a certain extent. Further, the lampshade 230 makes an appearance of the lighting device beautiful.

Figure 6:
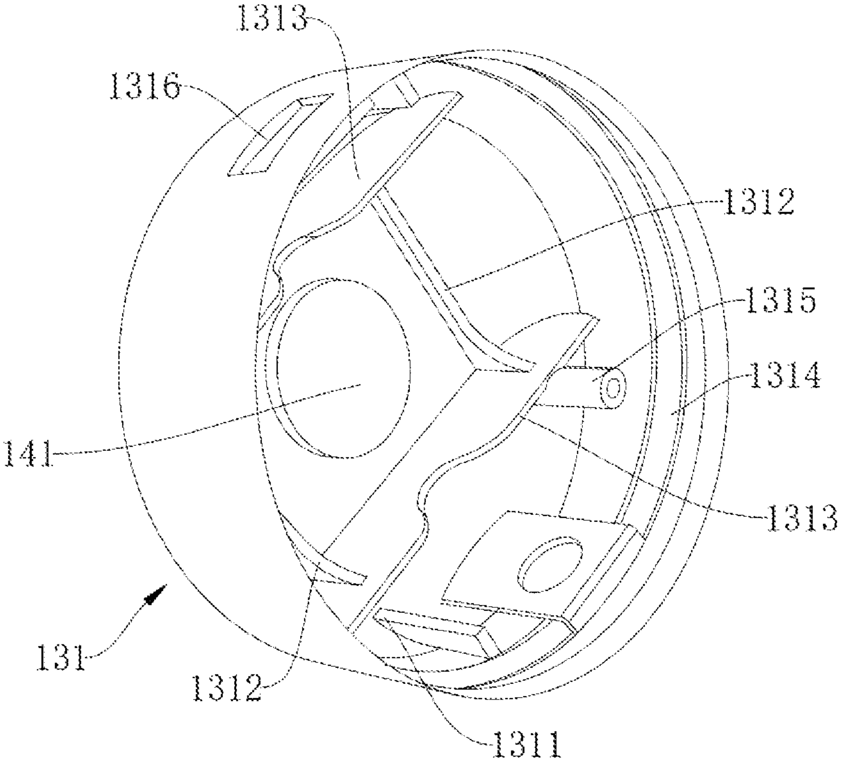
FIG. 6 is a schematic diagram of an outer shell according to one embodiment of the present disclosure.
Figure 7:
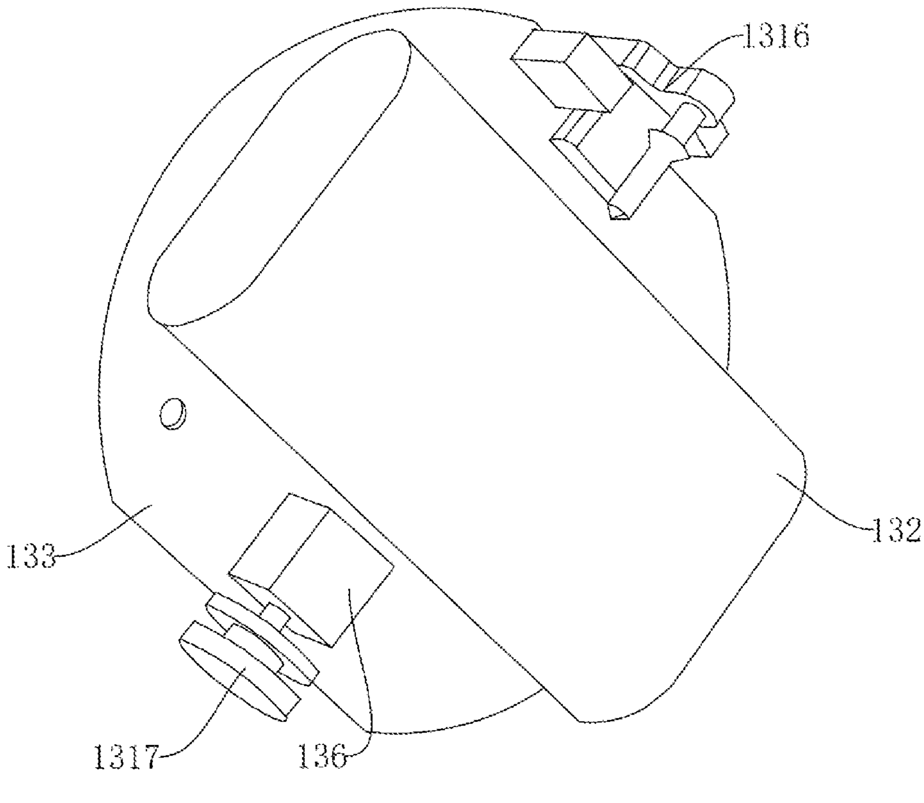
FIG. 7 is a schematic diagram of a power supply and a PCB shown in an assembled state according to one embodiment of the present disclosure.

As shown in FIGS. 5-7, in some embodiments, the light source assembly 130 comprises an outer shell 131, a power supply 132, a printed circuit board (PCB) 133 and LED lamp beads 134. The outer shell 131 is movably connected to the light source base 120. The power supply 132 is arranged in the outer shell 131. The PCB 133 is electrically connected to the power supply 132. The LED lamp beads 134 are arranged on the PCB 133. In some embodiments, a charging interface 1316 is arranged on the outer shell 131. The charging interface 1316 is electrically connected to the power supply 132. The charging interface 1316 is configured to charge the power supply 132, which is convenient to use the light source assembly 130 of the embodiment of the present disclosure. It is understood that in some embodiments, the power supply 132 is able to be replaced directly. In some embodiments, the outer shell 131 comprises an accommodating groove 1311, a first supporting portion 1312 arranged in the accommodating groove 1311, and two second supporting portions arranged 1313 in the accommodating groove 1311. The first supporting portion 1312 is perpendicular to the two second supporting portions 1313. The two second supporting portions 1313 are arranged on two opposite sides of the first supporting portion 1312. A top portion of the first supporting portion 1311 defines an arc-shaped section matched with a shape of the power supply 132. A fixing groove configured to fix the power supply 132 is defined between the two second supporting portions 1313. Therefore, the installation of the light source assembly 130 of the embodiment of the present disclosure is facilitated. The power supply 132 is positioned making assembled internal structures stable. In some embodiments, the outer shell 131 comprises at least two fixing columns 1315 arranged in the accommodating groove 1311. The PCB 133 is fixed on the at least two fixing columns 1315. Therefore, the PCB 133 is installed and fixed.

In some embodiments, the magnetic attracting piece 141 is arranged on the outer shell 131. The magnetic attracting matching piece 142 is arranged on the mounting portion 122. It is understood that the magnetic attracting piece 141 is arranged on the outer shell 131, so that the light source assembly 130 is magnetically attracted and fixed on the light source base 120, and the light source assembly 130 is also matched and fixed to another metal that is able to magnetically attract the magnet, for example, an iron door, an iron cabinet, an iron tabletop, etc., which increases the usage scenarios of the light source assembly 130 of the embodiments of the present disclosure, and improves the functionality of the light source assembly 130 in the embodiments of the present disclosure.

In some embodiments, the light source assembly 130 further comprises a diffusing piece 135. The diffusing piece 135 is fixedly connected to the outer shell 131 and located in a light emitting direction of the LED lamp beads 134. In some embodiments, the diffusing piece 135 is of an arc-shaped structure, the arc-shaped structure enables the light emitted by the light source assembly to diverge uniformly. Alternatively, the diffusing piece 135 may also be a plate-shaped structure or a conical section structure, which is not limited thereto. A protruding connecting portion 1351 is arranged at a position of the diffusing piece 135 where the diffusing piece 135 is connected to the outer shell 131. A groove 1314 matched with the protruding connecting portion 1351 is defined in the outer shell 131. When installing, the protruding connecting portion 1351 is fastened and fixed in the groove 1314, so that the diffusing piece 135 is fixedly connected to the outer shell 131. The diffusing piece 135 is designed as a plastic piece, which has a certain deformation capability, so that the diffusing piece is simple to install, which improves a production efficiency and is convenient to disassemble. It is understood that in some embodiments, the diffusion piece 135 and the outer shell 131 may be fixed by threaded pieces such as screws or bolts.

When the light source assembly 130 in the embodiments of the present disclosure is installed, the magnetic attracting piece 141 is first assembled at a bottom portion of the accommodating groove 1311, then the power supply 132 is assembled in the accommodating groove 1311 and located between the top portion of the first supporting portion 1312 and the two second supporting portions 1313, then the PCB 133 is fixed on the at least two fixing columns 1315 by screws or bolts, and finally, the diffusing piece 135 is assembled at an opening of the outer shell 131 to complete the installation.

It is understood that, in some embodiments, the LED lamp beads 134 are configured to emit the light of at least two colors, and the brightness of the light emitted by the LED lamp beads 134 is adjustable, so that various light requirements of various usage scenarios are met. For example: in a bedroom, soft yellow light of the LED lamp beads 134 is needed during sleep, but brighter white light of the LED lamp beads 134 is provided for daily use. In another example, when watching movies in a living room, the brightness of the light of the LED lamp beads 134 is lowered to create a good viewing atmosphere, and the brightness of the light is raised for daily use.

In some embodiments, the light source assembly 130 further comprises a control component 136. The control component 136 is installed in the outer shell 131 and is communicated with the PCB 133. The control component 136 is configured to control the LED lamp beads 134 to emit the light. It is understood that the control component 136 comprises a wireless connector. Through the wireless connector, the control component 136 is communicated with an external controller or a control device where a control application (APP) is installed. The user is able to use the controller or the control device to transmit a control signal to the control component 136, and then the control component 136 transmits the control signal to the PCB 133, so that a lighting control of the light source assembly 130 of the embodiment of the present disclosure is remotely controlled, so as to control the color, the brightness, etc. of the light source assembly 130.

In some embodiments, a button 1317 is arranged on the outer shell 131. The button 1317 is communicated with the control component 136. The button 1317 is configured to control the LED lamp beads 134 to emit the light. When in use, by pressing the button 1317, the LED lamp beads 134 is switched between various working states such as starting to emit light, adjusting the color of the light emitted, and stopping emitting light. It is understood that in some embodiments, both of the button 1317 and the wireless connector are provided, and in some embodiments, the button 1317 and the wireless connector are alternatively provided.

In some embodiments, a positioning portion 151 is arranged on one of the light source assembly 130 and the light source base 120. A positioning groove 152 is defined on the other one of the light source assembly 130 and the light source base 120.

The positioning portion 151 is matched with the positioning groove 152, so as to realize mounting and fixing of the light source assembly and the light source base, which avoids rotation of the light source assembly. In some embodiments, the positioning portion 151 is arranged on one of the outer shell 131 and the mounting portion 122. The positioning groove 152 is defined on the other one of the outer shell 131 and the mounting portion 122.

In some embodiments, the mounting portion 122 comprises a horizontal loading surface 1221, and an arc-shaped guide surface 1222 is located on an outer edge of the horizontal loading surface 1221 and extends upward. The arc-shaped guide surface 1222 is matched with a shape of a bottom portion of the outer shell 131. The bottom portion of the outer shell 131 is fixedly attached to the horizontal loading surface 1221 and the arc-shaped guide surface 1222.

When the light source assembly 130 and the light source base 120 are installed and fixed, the bottom portion of the outer shell 131 is attached and fixed to the horizontal loading surface 1221 and the arc-shaped guide surface 1222, so that the outer shell 131 and the light source base 120 form a whole in appearance. That is, the connecting piece110, the light source base 120, and the light source assembly 130 forms the LED device in appearance, and the appearance thereof is attractive.

In some embodiments, the magnetic attracting piece141 or the magnetic attracting matching piece142 is arranged in a middle portion of the mounting portion 122 to form the horizontal loading surface 1221, so that the installation thereof is simpler and the processing efficiency is improved. Alternatively, in some embodiments, the magnetic attracting piece141 or the magnetic attracting matching piece142 is arranged in a middle portion of the mounting portion 122, thereby forming the arc-shaped guide surface 1222.

In the embodiments of the present disclosure, the mounting piece220 is installed on the mounting surface such as the wall surface or the desktop, that is, the mounting device 200 can be installed in different usage scenarios. The connecting piece110 in the LED device 100 is connected to the connecting fitting piece, that is, the LED device 100 is relatively fixed on the mounting device 200. According to the embodiments of the present disclosure, the connecting piece110 in the LED device 100 is detachably connected to the light source base 120, and the light source base 120 may be connected to the different mounting devices by replacing the connecting piece110 selecting from connecting pieces having different specifications or shapes.

In addition, the light source base 120 and the light source assembly 130 are magnetically connected to facilitate installation, fixing, and detach of the LED device, so that the light source assembly selecting from light source assemblies having different specification or type is installed on the light source base 120. The LED device 100 of the embodiments of the present disclosure may be installed in different usage scenarios and has high adaptability, and the light source assembly 130 independently emits light without external circuit wiring, thereby satisfying the requirements of maintaining the original layout of the old house and retaining the original appearance of the old house. Further, the LED device is easy to install, and is compatible with the use requirements of different usage environments.

In the drawings of the embodiments, the same or similar numbers correspond to the same or similar components; in the description of the present disclosure, it should be understood that terms such as “upper”, “lower”, “left”, “right” etc. indicate direction or position relationships shown based on the drawings, and are only intended to facilitate the description of the present disclosure and the simplification of the description rather than to indicate or imply that the indicated device or element must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be included in the protection scope of the present disclosure.

What is claimed is:

1. An LED device, comprising:

a connecting piece, a light source base, a light source assembly, and a magnetic attracting assembly;

wherein the light source base comprises a fixing portion and a mounting portion; the fixing portion is connected to the mounting portion; the fixing portion is connected to the connecting piece;

wherein the magnetic attracting assembly is arranged between the light source assembly and the mounting portion; the magnetic attracting assembly is configured to magnetically connect the light source assembly to the mounting portion, so that the light source assembly is movably installed on the light source base;

wherein the magnetic attracting assembly comprises a magnetic attracting piece and a magnetic attracting matching piece; the magnetic attracting piece is installed on one of the light source assembly and the mounting portion; the magnetic attracting matching piece is installed on the other one of the light source assembly and the mounting portion;

wherein the light source assembly comprises an outer shell, a power supply, a printed circuit board (PCB), and LED lamp beads; the outer shell is movably connected to the light source base; the power supply is arranged in the outer shell; the PCB is electrically connected to the power supply; the LED lamp beads are arranged on the PCB;

wherein the outer shell comprises an accommodating space, a first supporting portion arranged in the accommodating space, and two second supporting portions arranged in the accommodating space; the first supporting portion is perpendicular to the two second supporting portions; the two second supporting portions are arranged on two opposite sides of the first supporting portion; a top portion of the first supporting portion defines an arc-shaped section matched with a shape of the power supply; a fixing groove configured to fix the power supply is defined between the two second supporting portions.

2. The LED device according to claim 1, wherein the magnetic attracting piece is a magnet body; the magnetic attracting matching piece is a matching magnet or a metal piece capable of magnetically connected to the magnet body.

3. The LED device according to claim 1, wherein the fixing portion is detachably connected to the connecting piece.

4. The LED device according to claim 1, wherein the magnetic attracting piece is arranged on the outer shell; the magnetic attracting matching piece is arranged on the mounting portion.

5. The LED device according to claim 1, wherein the light source assembly further comprises a diffusing piece; the diffusing piece is fixedly connected to the outer shell and located in a light emitting direction of the LED lamp beads.

6. The LED device according to claim 5, wherein a protruding connecting portion is arranged at a position of the diffusing piece where the diffusing piece is connected to the outer shell; a groove matched with the protruding connecting portion is defined in the outer shell; the protruding connecting portion is fastened and fixed in the groove, so that the diffusing piece is fixedly connected to the outer shell.

7. The LED device according to claim 1, wherein the outer shell comprises at least two fixing columns arranged in the accommodating space; the PCB is fixed on the at least two fixing columns.

8. The LED device according to claim 1, wherein a charging interface is arranged on the outer shell; the charging interface is electrically connected to the power supply; the charging interface is configured to charge the power supply.

9. The LED device according to claim 1, wherein the light source assembly further comprises a control component; the control component is installed in the outer shell and is in electrical communication with the PCB; the control component is configured to control the LED lamp beads to emit light.

10. The LED device according to claim 9, wherein a button is arranged on the outer shell; the button is communicated with the control component; the button is configured to control the LED lamp beads to emit the light.

11. The LED device according to claim 1, wherein a positioning portion is arranged on one of the outer shell and the mounting portion; a positioning groove is defined on the other one of the outer shell and the mounting portion.

12. The LED device according to claim 1, wherein the connecting piece is a housing defining a fixing cavity; the fixing cavity is arranged on a middle portion of the connecting piece; outer threads are defined on an outer surface of the housing; the fixing portion is fixed in the fixing cavity.

13. The LED device according to claim 1, wherein the mounting portion comprises a horizontal loading surface, and an arc-shaped guide surface is located on an outer edge of the horizontal loading surface and extends upward; the arc-shaped guide surface is matched with a shape of a bottom portion of the outer shell; the bottom portion of the outer shell is fixedly attached to the horizontal loading surface and the arc-shaped guide surface.

14. A lighting device; comprising:

a mounting device, a connecting fitting piece, and the LED device according to claim 1;

wherein the connecting fitting piece is configured to connect to the connecting piece; the mounting device is fixedly connected to the connecting fitting piece.

15. The lighting device according to claim 14, wherein the mounting device comprises a bracket body; the bracket body is connected to the connecting fitting piece.

16. The lighting device according to claim 15, wherein the mounting device comprises a lampshade; the lampshade is connected to the bracket body; the lampshade is located outside the LED device.

17. The lighting device according to claim 15, wherein the mounting device comprises a mounting piece; the mounting piece is connected to the bracket body and is configured to fixedly connect to a mounting surface of a mounting object.

* * * * *